No. 708,640. Patented Sept. 9, 1902.
A. C. & A. W. HILSINGER.
PULVERIZER.
(Application filed Nov. 24, 1899. Renewed Apr. 10, 1902.)

(No Model.) 10 Sheets—Sheet 3.

Witnesses: Inventors:

No. 708,640. Patented Sept. 9, 1902.
A. C. & A. W. HILSINGER.
PULVERIZER.
(Application filed Nov. 24, 1899. Renewed Apr. 10, 1902.)

(No Model.) 10 Sheets—Sheet 7.

Witnesses: Inventors:
Alburtis C. Hilsinger
Adin W. Hilsinger
By their Attorney
George William Miatt No. 708,640. Patented Sept. 9, 1902.
A. C. & A. W. HILSINGER.
PULVERIZER.
(Application filed Nov. 24, 1899. Renewed Apr. 10, 1902.)
(No Model.) 10 Sheets—Sheet 9.
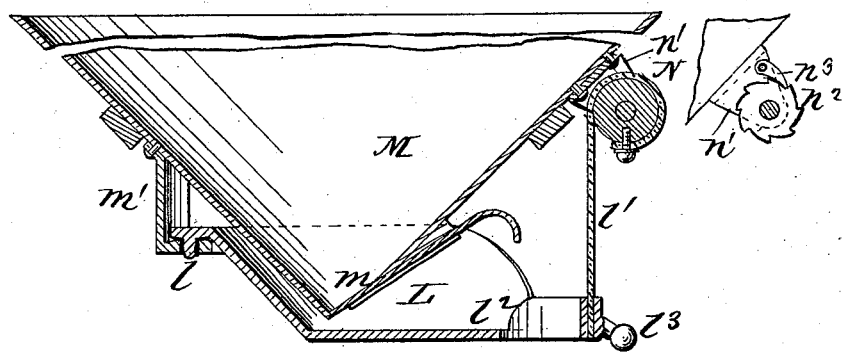
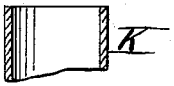
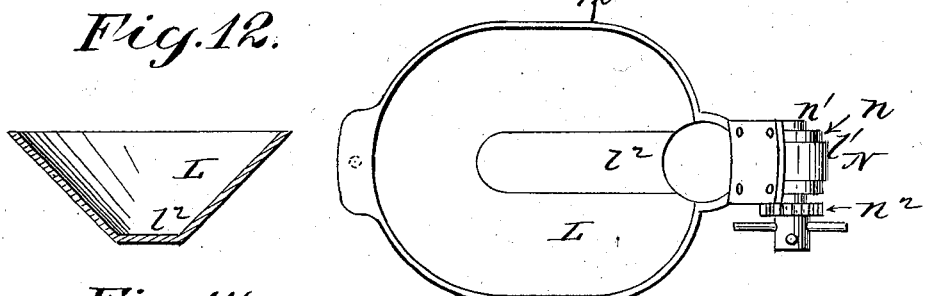
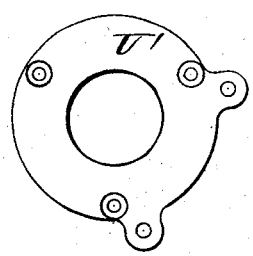
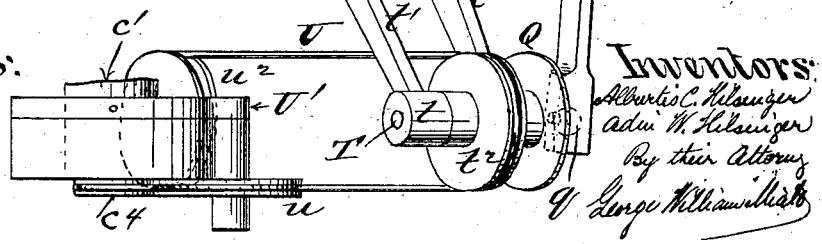

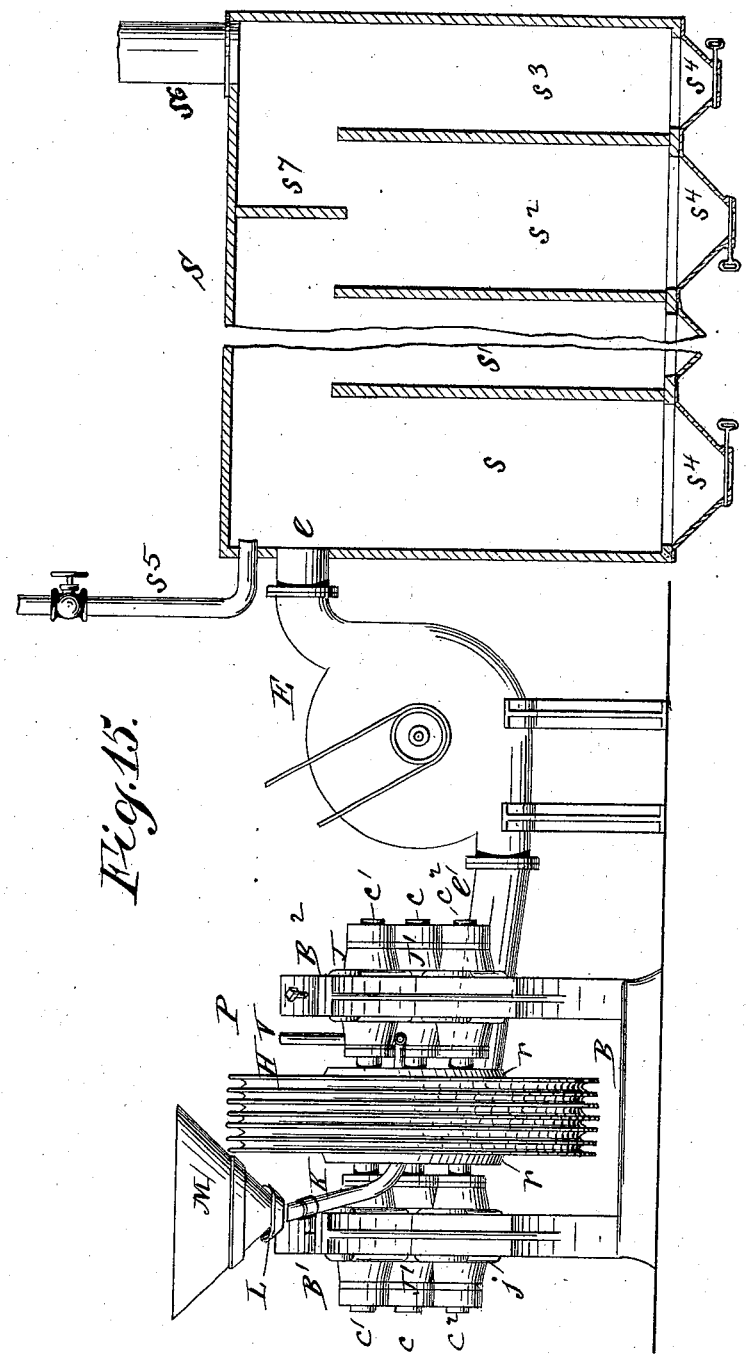

UNITED STATES PATENT OFFICE.

ALBURTIS C. HILSINGER, OF NEW YORK, N. Y., AND ADIN W. HILSINGER, OF ORANGE, NEW JERSEY, ASSIGNORS TO CALVIN AMORY STEVENS, OF NEW YORK, N. Y.

PULVERIZER.

SPECIFICATION forming part of Letters Patent No. 708,640, dated September 9, 1902.

Application filed November 24, 1899. Renewed April 10, 1902. Serial No. 102,263. (No model.)

*To all whom it may concern:*

Be it known that we, ALBURTIS C. HILSINGER, of the city, county, and State of New York, and ADIN W. HILSINGER, of Orange, Essex county, and State of New Jersey, citizens of the United States, have invented certain new and useful Improvements in Pulverizers, of which the following is a specification sufficient to enable others skilled in the art to which the invention appertains to make and use the same.

Our improvements relate to pulverizing apparatus in which crushing-rolls are arranged within a rotatable crushing-ring.

Our invention is designed to simplify and cheapen the construction of the mill, to obviate wear, and to utilize fully the power applied to the reduction of the material under treatment.

Our invention consists in the special construction and arrangement of parts herein set forth and claimed specifically.

Figure 1:
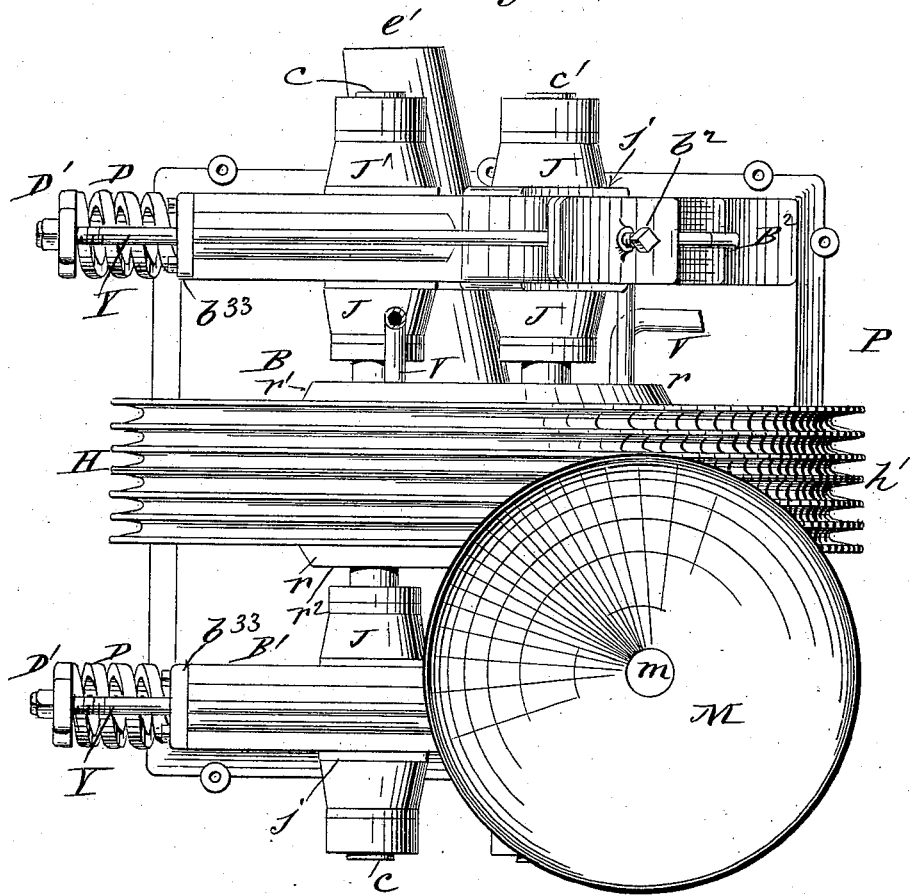
Figure 2:
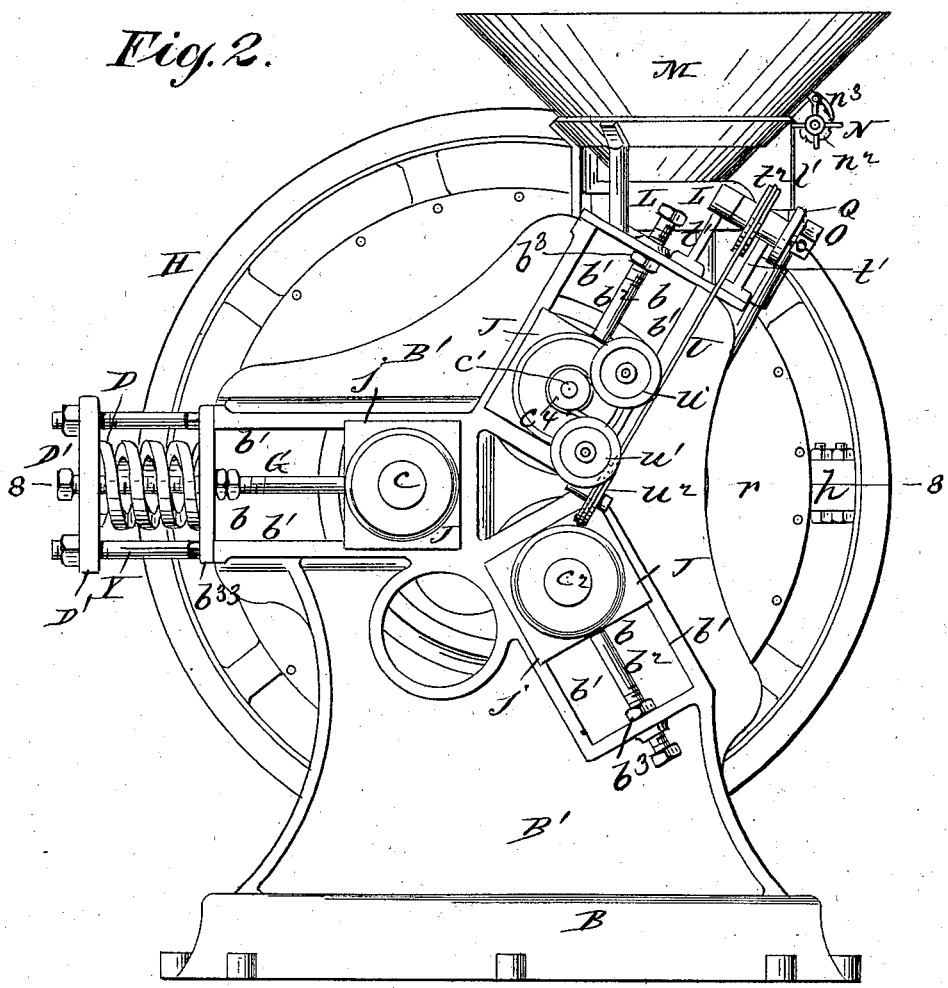
Figure 3:
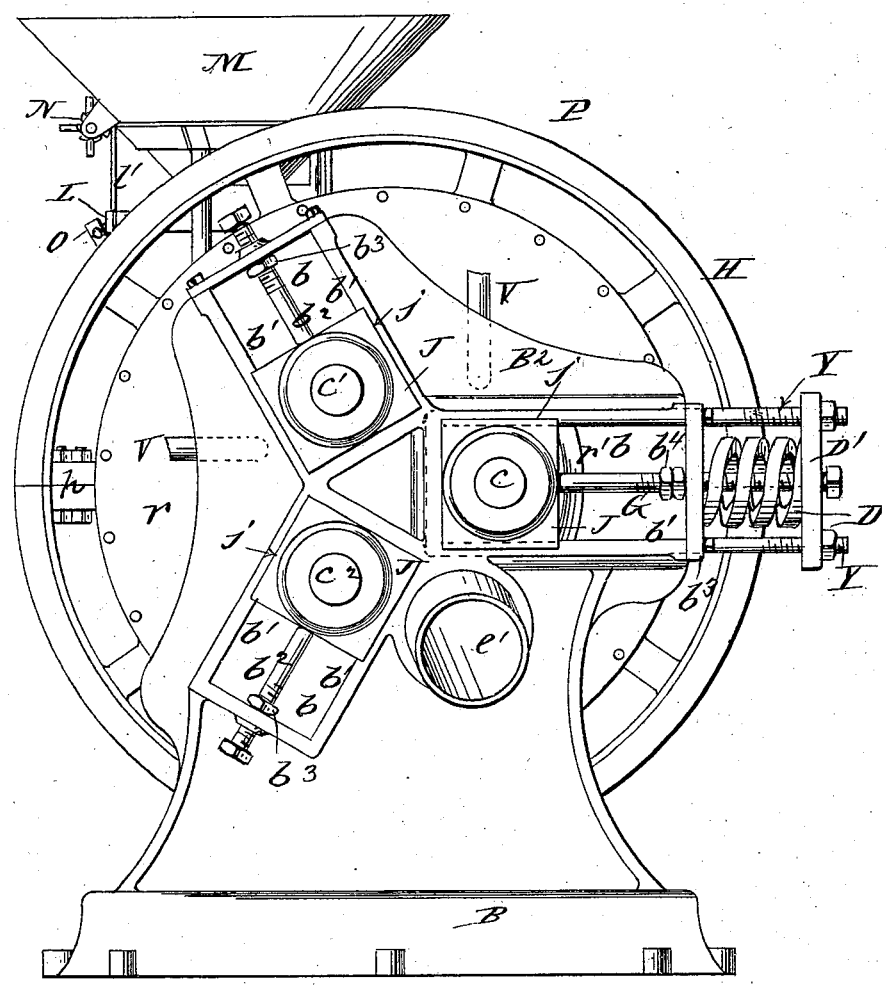
Figure 4:
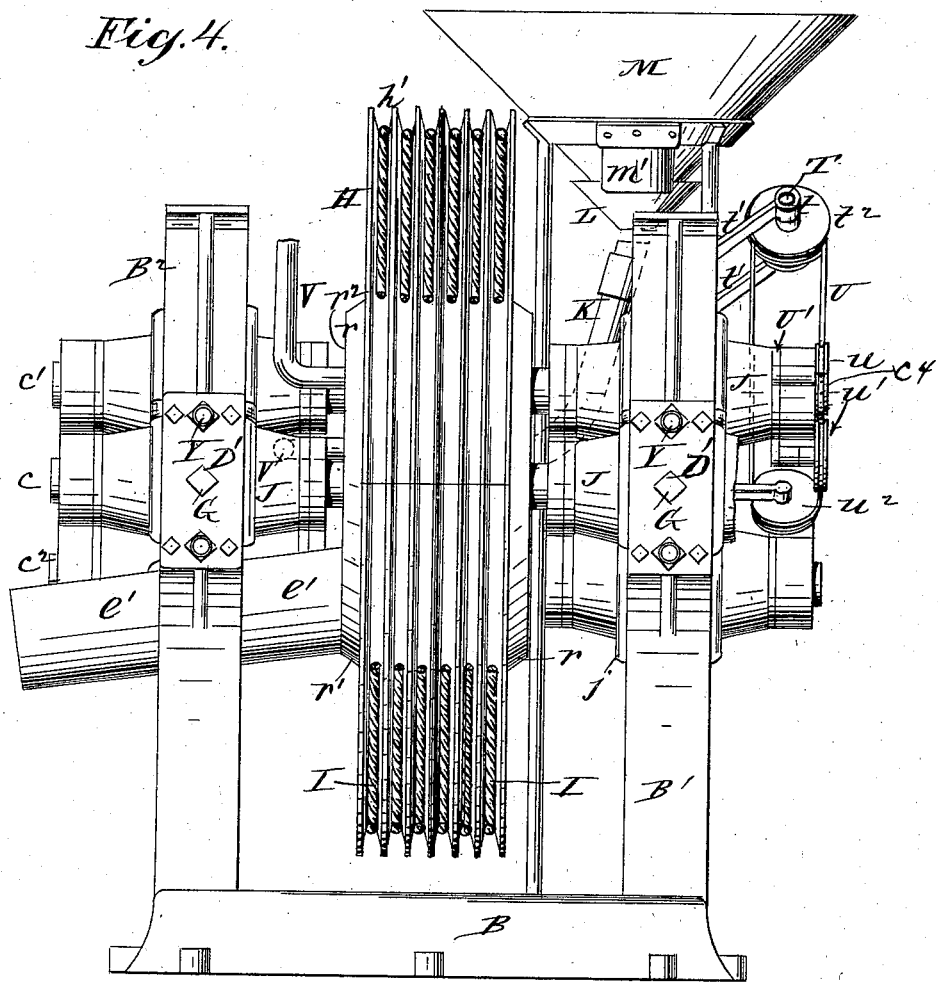
Figure 5:
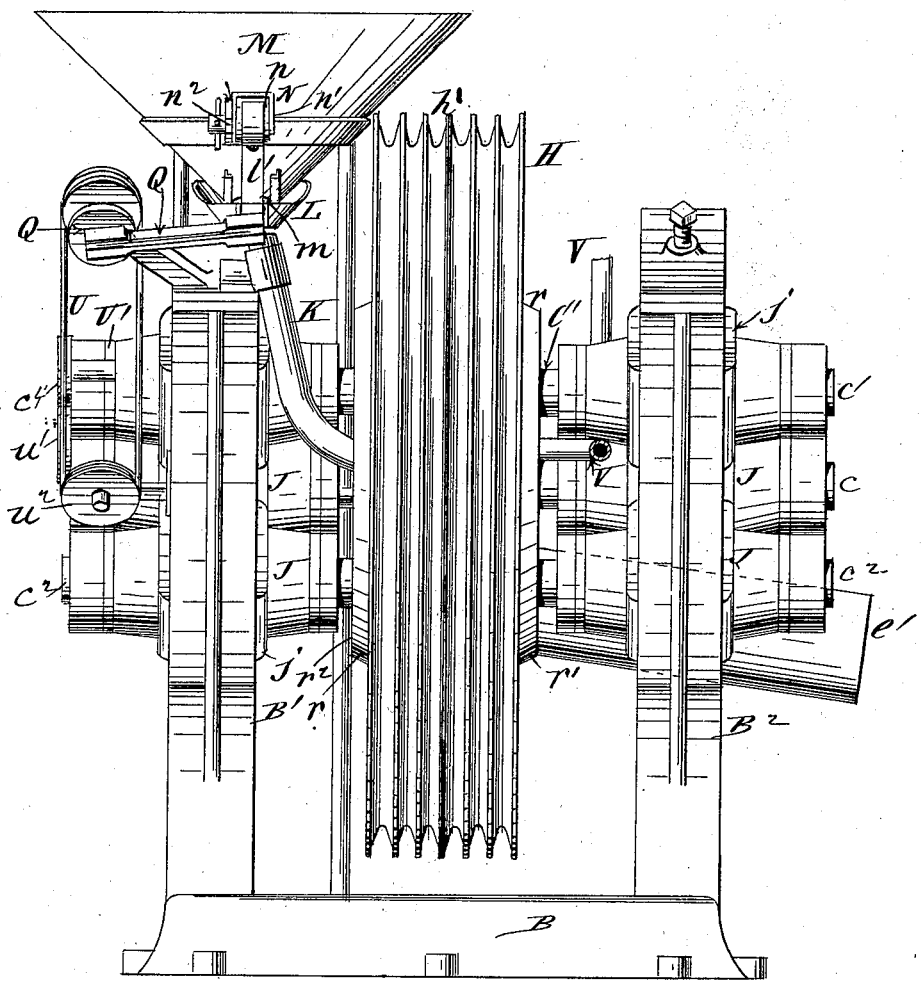
Figure 6:
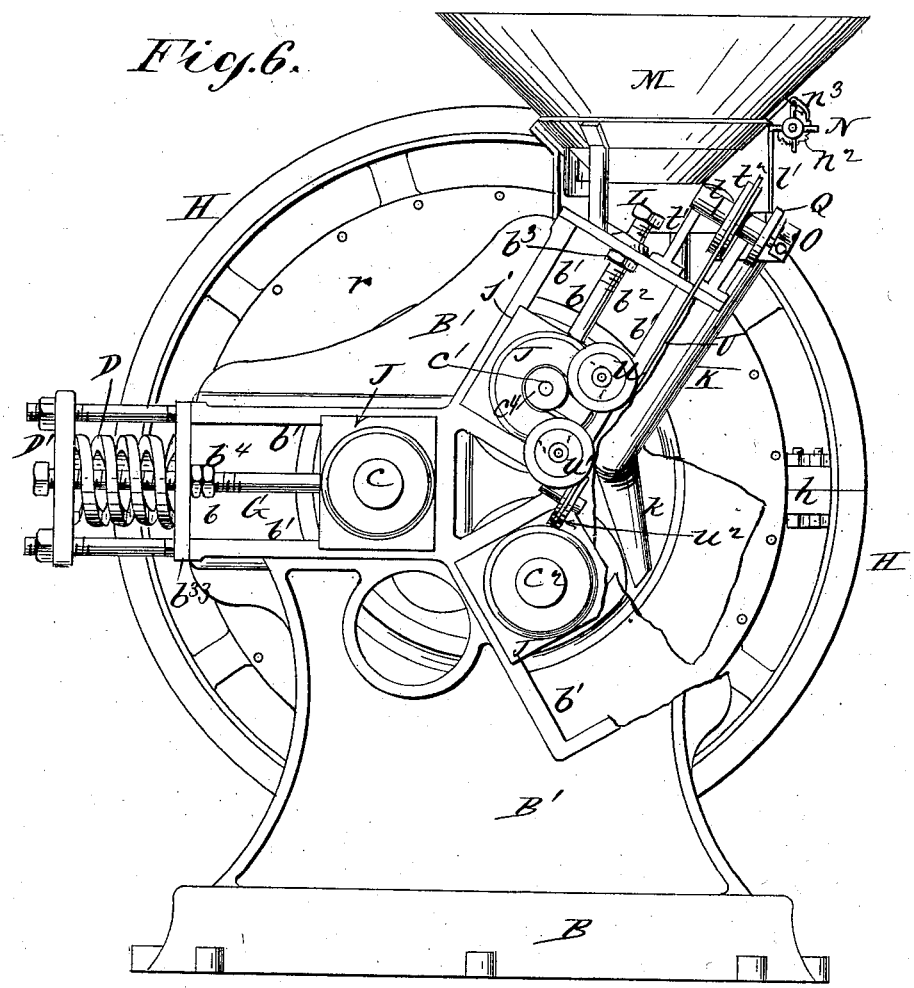
Figure 7:
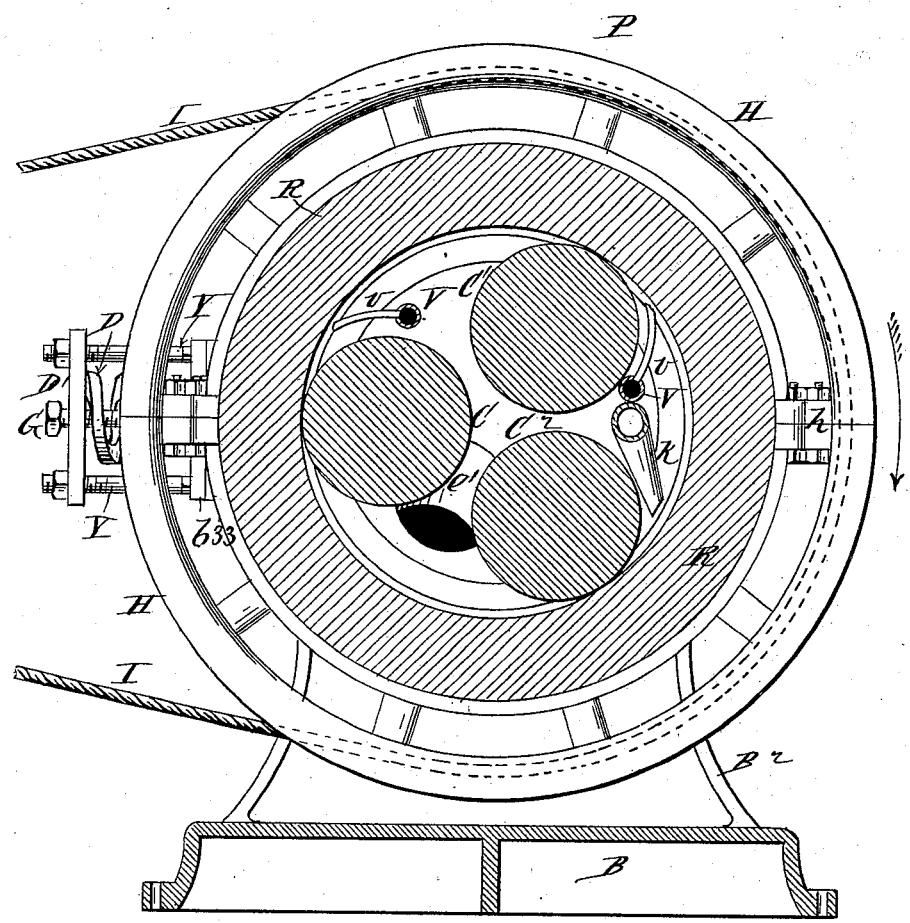
Figure 8:
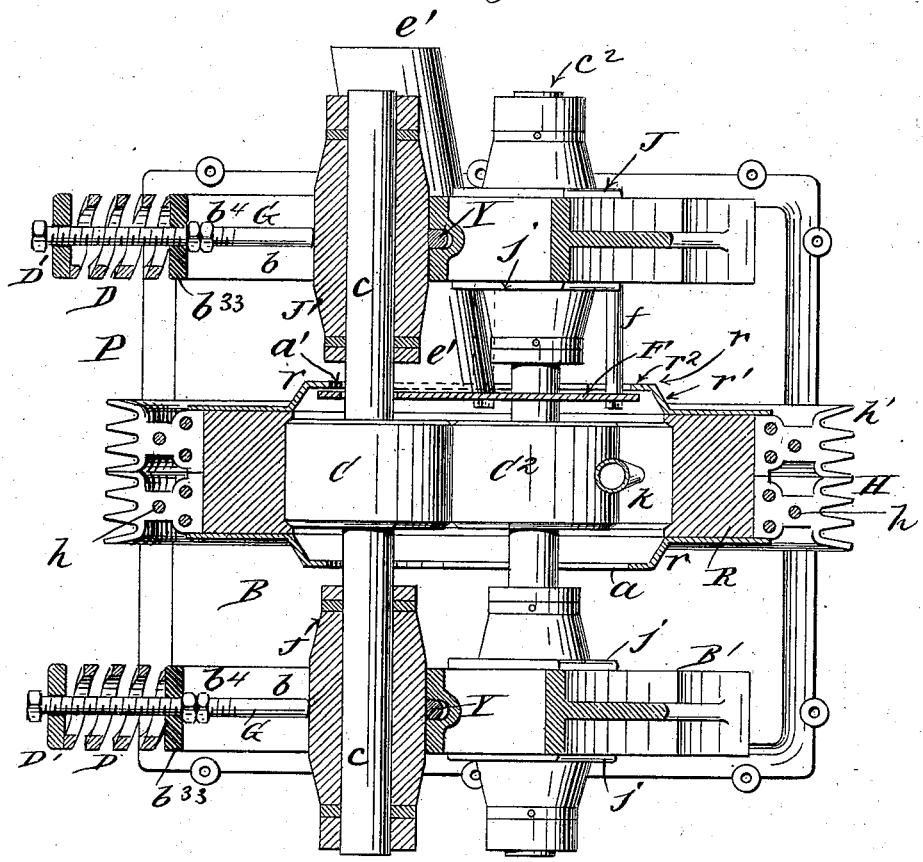
Figure 9:
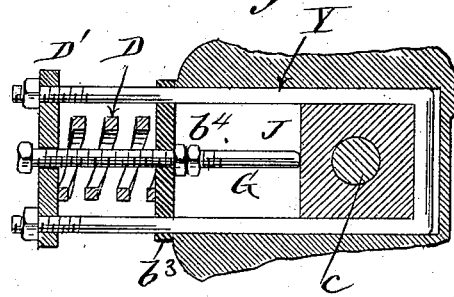

In the accompanying drawings, Figure 1 is a plan of our improved pulverizing apparatus; Fig. 2, a front elevation of the same; Fig. 3, a rear elevation; Fig. 4, an elevation taken on the left-hand side of the apparatus; Fig. 5, an elevation taken upon the right-hand side of the apparatus. Fig. 6 is an elevation similar to Fig. 3, representing portions of one of the frames and of one of the dust-plates broken away to show the feed connections. Fig. 7 is a vertical section of the frame, ring, crushing-rolls, &c., showing the belt-pulley in elevation. Fig. 8 is a horizontal section upon plane of line 8 8, Fig. 2. Fig. 9 is a sectional view of one of the yielding bearings used in conjunction with one of the two crushing-rolls. Fig. 10 is a sectional view of the hopper and connections. Fig. 11 is a top view of the shaker; Fig. 12, a cross-section on plane of line 12 12, Fig. 11. Fig. 13 is a top view of the shaker and vibrating mechanism; Fig. 14, a detail of the bracket for supporting the rollers forming part of the vibratory mechanism; Fig. 15, an elevation of the pulverizer upon a reduced scale, showing its combination with an exhaust and with our improved means for collecting and sorting the pulverized material.

P represents the pulverizer as a whole.

E is an exhaust device interposed between the pulverizer P and the sorting-chamber S. The exhaust device E may consist of a fan or any other well-known mechanical expedient for transferring air charged with pulverized material from the interior of the mill P into the collecting-chamber S. The settling or sorting chamber S is formed with a series of compartments $s$ $s'$ $s^2$ $s^3$, each of which is provided at its lower extremity with a converging hopper $s^4$ and a gate for the discharge of its contents when desired. Watery vapor is introduced into the chamber S by any suitable means, as by the pipe $s^5$, by which a jet of steam or spray of water may be injected into the compartment, preferably above the inlet $e$, from the exhaust E. The watery vapor in the chamber S tends to arrest and precipitate the pulverized material carried by the air-current into the chamber, the material being sorted by gravity into the several compartments below according to the various degrees of fineness. This action of the watery vapor upon the floating particles is effective in arresting them and precipitating them from the air-current before the latter escapes through the discharge-passages $s^6$. If desired, retarding-partitions $s^7$ may be interposed in the path of the air-current for the purpose of causing it to deviate from a direct line in its course to the discharge-flue $s^6$ or to present a positive barrier to particles precipitated with great force from the inlet $e$.

B is the base-plate of the apparatus, from which project upward the two frames or standards B' B². Each frame is formed with three radial openings $b$, having parallel edges $b'$, which constitute the ways for the journal-boxes J, carrying the shafts $c$ $c'$ $c^2$ of the crushing-rolls C C' C², the flanges $j$ of said journal-boxes J engaging with the said parallel ways $b'$ on either side of the frame. The boxes in which are journaled two of the crushing-rolls C' C² are preferably after adjustment held rigidly in position by means of the screw-bolts $b^2$ and lock-nuts $b^3$ or by equivalent means. The boxes of the other crushing-roll C have a degree of motion limited by the adjustable gages G, which are shown in the drawings as consisting of screws engaging with female screw-threads in the cross-bars $b^{33}$, secured rigidly to the frames B' B². Lock-nuts $b^4$ are preferably used in connection with the screws G. The journal-boxes J are held against the ends of the gages G by means of springs D, acting through the yokes Y, said yokes being connected with the cross-head D', between which and the cross-bars $b^{33}$ the said springs D are interposed. The frames are recessed, as will be understood by reference to Figs. 8 and 9, to accommodate the yokes Y and to admit of the required degree of motion. The screws G extend up through the cross-head D' merely for convenience of adjustment and do not engage therewith.

R is the crushing-ring, which is supported upon the three crushing-rolls C C' C², its inner annular surface constituting the crushing-floor. The ring R is provided on each side with flange-plates $r$, having the inclined surfaces $r'$ and also the parallel edges $r^2$, projecting inward centrally, so as to retain the material and to return it to the crushing-surface of the ring until reduced sufficiently to be carried off by the air-exhaust. One side of the ring, as $a$, is left open for the admission of air. The other side is closed by a dust-plate F, supported rigidly upon the adjoining frame by suitable arms or brackets $f$. Into this dust-plate F opens the exhaust-pipe $e'$, which communicates with the exhaust device E.

Attached peripherally and rigidly to the ring R is the pulley H, which receives the power transmitted through a belt or series of belts I, connected with a power-pulley and suitable source of power. This pulley H is made in two sections, which are clamped together, as at $h$ $h$, and it is preferably formed with a series of peripheral grooves $h'$ for the reception of a series of wire belts or ropes I, as indicated in the drawings.

The material to be reduced is fed onto the inner surface of the ring R by means of a spout $k$, forming the inner end of the feed-conduit K, which is supported rigidly upon the frame. The material is fed to the conduit K through the medium of a shaker L, which receives the material directly from the hopper M, said hopper being formed with a gate $m$, controlling the opening into the shaker L. The latter is pivotally supported at $l$ upon a bracket $m'$, secured to the hopper or to any other stationary part of the apparatus. The opposite end of the shaker L is suspended by a band $l'$ to a windlass N, supported in brackets $n$, secured to the side of the hopper M or other stationary part of the apparatus. The axle $n'$ of the windlass N is provided with a ratchet-wheel $n^2$, the teeth of which engage with a pawl $n^3$, secured to the adjoining bracket $n$. Thus by varying the engagement of the pawl with the different teeth of the ratchet $n^2$ this end of the shaker L may be raised or lowered, as desired, to regulate the inclination of the floor $l^2$ of the shaker L. A vibratory motion is imparted to the shaker L by means of a pitman O, engaging with a projection $l^3$ of the shaker L at one end and at the other end with a similar projection $q$ on a crank-disk Q, secured to a small counter-shaft T, mounted in bearings $t$ on ends of brackets $t'$ $t'$, secured to the frame B². The shaft T carries a pulley $t^2$, which receives motion through the belt U from the pulley $c^4$, secured to the front end of the shaft $c'$ of the fixed crushing-roll C', said belt passing over the idlers $u$ $u'$ $u^2$, two of which, $u$ and $u'$, are mounted upon the frame adjoining the box, as will be seen by reference to Figs. 2, 4, and 6. Pipes V, having nozzles $v$, are arranged to conduct air or fluid to the inner surface of the ring R when desired, as will be understood by reference to Fig. 7.

The operation is as follows: The material to be reduced having been dumped into the hopper M and the inclination of the shaker L having been adjusted with relation to the size and nature of such material by means of the ratchet $n^2$ and pawl $n^3$, upon opening the gate $m$ more or less the material descends to the shaker L, the vibration of which gradually feeds it from the edge of its floor $l^2$ into the upper end of the conduit K, the vibration of the shaker L being accomplished by the shaft $c'$ through the medium of the belt U, its pulleys, and connections, as hereinbefore described. The material descends through the conduit K to the spout $k$ and is delivered thereby to the inner surface of the ring R in front of the crushing-roller C², (the ring R being rotated in the direction indicated by the arrow in Fig. 7.) As the material thus introduced is carried between the inner surface of the ring R and the periphery of the crushing-roll C² (the latter being supported in fixed bearings) the ring yields more or less to adapt itself to the thickness of the material and in so doing throws the strain upon the movable roll C and through it onto the springs D'—that is to say, the ring R pulls the said roll C inward centrally against the resistance of the said springs imparted to the boxes J through the medium of the yokes Y. Thus the strain is taken up and compensated for and also distributed among the rolls by the springs acting upon a single movable roll, which yields to the material carried by the inner surface of the ring and between the surface of such ring and the peripheries of all three of the rolls, so that the pressure or power exerted is practically uniform and equal for all the rolls, while each roll is positively and independently rotated directly by the ring itself. This feature is of practical advantage as compared with the old method of applying the power to one of the crushing-rolls only, trusting to the ring to impart the power and motion indirectly to the other rolls, in which case if there was slip between the power-roll and the ring the other rolls were practically inoperative. It will thus be seen that all the power transmitted to the rings is utilized in work and that it is evenly distributed between the parts and operating surfaces, resulting in a more perfect reduction of the material and a lessening of wear and tear upon the apparatus. As the material becomes sufficiently reduced to be carried off by the induced current of air as a vehicle it is conveyed to the collecting and sorting chamber S, as hereinbefore stated, the open side $a$ of the ring admitting air freely for this purpose, the tendency to vacuum within the ring preventing any escape of dust or material from the ring excepting through the conduit $e'$.

Another advantage of our arrangement of crushing-ring is that the fixed pulleys $C'$ $C^2$ sustain the main strain of the belt and throw it back upon the ring and through the ring to the movable crushing-roll C to be neutralized and distributed by the springs. Furthermore, the two fixed bearings or centers $C'$ $C^2$ always preserve the alinement of the parts, so that the yielding of the ring is always practically in a line with the axis of the compensating springs $D'$.

Another advantage of our special construction of apparatus is that the interior of the ring is freely accessible upon one side for the purpose of cleaning, &c.

Our special arrangement and construction of parts for adjusting and vibrating the shaker has special advantages in that it is adapted to the treatment of material of various kinds and sizes, since by adjusting the inclination of the shaker with relation to the material an even uniform feed is attained, which is desirable in order to insure the smooth running of the mill.

We are aware that a plurality of crushing-rolls have been arranged within a rotatable crushing-ring, and we do not claim this combination broadly.

What we claim as our invention, and desire to secure by Letters Patent, is—

In pulverizing apparatus the combination of a rotatable crushing-ring to the periphery of which the power is applied directly, two internal crushing-rolls with fixed bearings arranged to oppose the power applied to the ring, and a crushing-roll having two movable bearings connected with springs which allow the said roller to yield to the material under treatment and to distribute and equalize the strain, substantially in the manner and for the purpose described.

ALBURTIS C. HILSINGER.
ADIN W. HILSINGER.

Witnesses:
D. W. GARDNER,
GEO. WM. MIATT.